Patented May 19, 1953

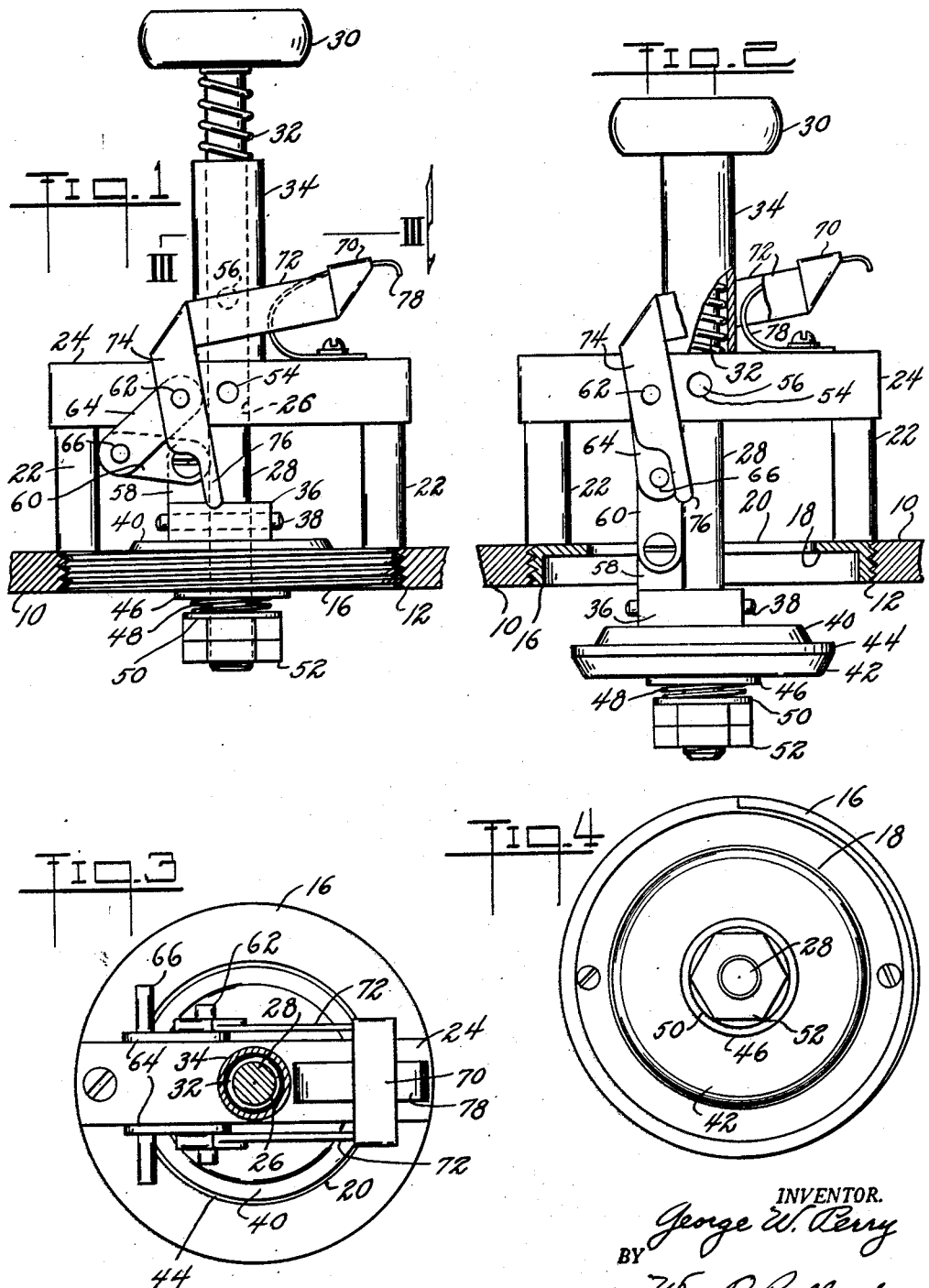

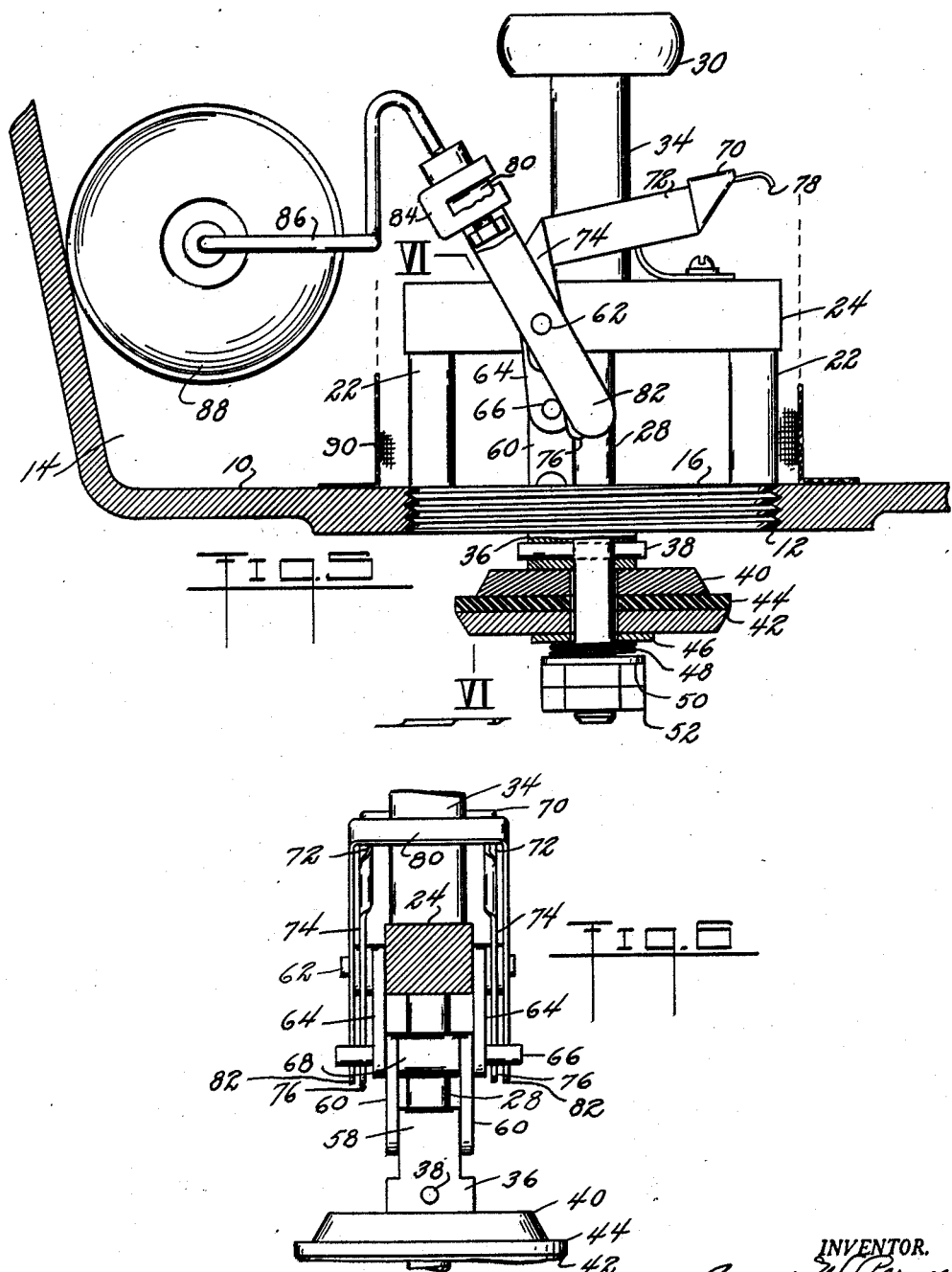

2,638,918

UNITED STATES PATENT OFFICE 2,638,918

QUICK CLOSING VALVE

George W. Perry, Port Clinton, Ohio

Application June 11, 1949, Serial No. 98,525

8 Claims. (Cl. 137—410)

This invention relates to valves. It is particularly adapted to valve construction of the type to be placed at the openings into drains for the prevention of back-flows therefrom.

An object of this invention is to provide a valve which may be mounted at the mouth of a drain and by means of a single thrust against an operating part, the valve may be opened and locked in its open position.

Another object of the invention is to provide additional means which also may be operated by a single thrust movement and in turn release the lock permitting mechanism, incorporated in the valve structure, to quickly and effectively close said valve against any back-flow.

Another object of the invention is to provide a lock release automatically operable whenever a quantity of back-flow escapes through the valve.

And another object of the invention is to provide a valve construction which effectively seals a drain opening against backflow and wherein any back-flow pressure operates to increase the seal, yet any sub-atmospheric pressure in the drain will cause a limited valve opening to permit drainage. In other words, when the valve is in closed position, it may still operate as a one-way check valve.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. 1 is a side elevation of a valve embodying features of the invention, the parts being shown in valve closed position;

Fig. 2 is a view similar to Fig. 1, the parts being shown in valve open position, with parts being broken away for illustration of certain details of the construction;

Fig. 3 is a view on the line III—III, Fig. 1;

Fig. 4 is a bottom plan view of the valve;

Fig. 5 is a view similar to Fig. 2 showing a form of the automatic lock release incorporated therewith; and Fig. 6 is a view on the line VI—VI, Fig. 5.

Plate 10 is provided with opening 12 therethrough and a valve of the invention herein may be mounted in such opening where it is desired to control or limit to one way, the flow of fluids therethrough. A typical installation is herein shown wherein the plate 10 may be the floor of a sump 14 leading to a drain. Herein the opening 12 is usually found to be threaded and hence externally threaded ring 16 may be conveniently screwed thereinto.

The ring 16 has valve seat 18 about its under side surrounding central or axial orifice 20 therethrough. A pair of diametrically disposed posts 22 are fixed to the opposite or upper face of the ring and in turn mount cross-piece 24. This frame construction provides a rigid bridge over the orifice 20 with the part 24 perforated to provide a seat or slide mounting 26 axially of the structure for valve stem 28 having reciprocatory movement therein. The upper end of the stem 28 is provided with a head 30 which not only serves as a convenient pedal or a manually engageable knob for operating the valve, but provides a stop for one end of spring 32 operating between it and the part 24. This spring is disposed to normally urge the valve stem toward valve closed position.

A tube 34 is mounted on the member 24 to encase a major portion of the spring 32 when the spring is expanded in its valve closing position and to serve as a stop for limiting the movement of the head 30 toward the member 24 in determining the full open valve position. In valve open position, the compressed spring 32 is substantially fully housed within the tube 34. Thus the spring is protected against accumulations of waste materials and damage by probes frequently used around drains.

Adjacent the valve stem terminus remote from the head 30, element 36 in the form of a block is fixed onto the stem by some suitable attaching means herein shown as a pin 38. Between this block and the adjacent stem terminus, a pile of elements is loosely disposed on the stem and provides the valve part to engage and cooperate with the seat 18. This group includes a minor plate 40 and a major plate 42, with a gasket 44 therebetween, preferably attached to the plate 42. A washer 46 abuts the outer side of the plate 42 against which spring 48 operates from washer 50 which in turn is engaged by a locknut assembly adjustable by thread engagement with the stem terminus.

The springs 32 and 48 are calibrated to allow the spring 32 to carry the gasket 44 against the seat 18 so that any back-flow against plate 42 operates to insure a seal. Any fluid of either liquid or gaseous nature operating with pressure against the plate 42 accents the seal. However, if there is a sub-atmospheric pressure prevailing in the drain, the spring 48 permits a limited opening of the valve so that any accumulated drainage at the mouth and about the valve may be drawn into the drain. Adjustment of the lock-nut assembly 52 against the weight of the plates 40, 42, permits a nice determination of this valve action.

The member 24 is provided with an opening 54 intersecting the seat 26 and the stem 28 is provided with an aperture 56 which registers with the opening 54 when the valve is open. This permits a pin or tool to be thrust therethrough to hold the valve open so that the gasket 44 may be serviced or changed and the valve seating force readily adjusted.

When the depressed pedal 30 is thrust its maximum distance toward the bridge in opening the valve, means is provided to lock the valve in its fully opened position. Such means is herein shown as a toggle-joint connection between the bridge and the reciprocative stem 28. The block 36 is provided with a lug 58 having a pair of links 60 pivotally connected thereto. The member 24 mounts a fulcrum providing pin 62 which is placed a slightly greater distance from the axis of the stem 28 than is the center of the pivotal connection of the links 60 to the lug 58. A pair of links 64 are pivotally mounted on the pin 62. The links 60, 64 have their adjacent termini pivotally connected together as an elbow by means of pin 66 which extends through this joint and outwardly therefrom in each direction.

As the valve reaches its fully open position, the links have thrown the pin 66 past dead center and consequently this toggle then provides a lock against the action of spring 32 closing the valve. A bushing 68 on the pin 66 between the pairs of links provides a stop for the lock by abutting against the stem 28.

A convenient pedal or thrust action device is provided to release this lock so that the spring 32 may close the valve. Such device includes a contact area 70 from which arms 72 extend to offsets 74 pivotally mounted on the pin 62 and having fingers 76 which engage the pin 66 when the part 70 is moved toward the bridge. The rocking of the piece 70, 72, 74, forces the fingers 76 to shift the pin 66 across dead center to initiate the collapse of the toggle-joint permitting the spring 32 to close the valve.

A leaf spring 78 between the bridge and pedal 70 normally holds the fingers 76 just clear of the pin 66 when the valve is in open position.

Whenever normal drain operation is desired, it is only necessary to push the head 30 toward the bridge and the valve will be locked in open position. In the event there is danger of back-flow, noticeable gas escape or any other reason, the valve is closed by a single thrust against the part 70. It is to be noted that the operating parts are all on the side of the valve away from the drain thereby minimizing corrosion or other destructive action from the drain or sewer contents. In a cycle of operation, the parts are moved one as to the other and in addition to their being of corrosion resistant materials, this overall movement maintains a freely operating condition.

In the event it is desired to augment the valve with an automatic closing attachment, a yoke 80 may also be pivotally mounted on the pin 62 with fingers 82 movable to shift the pin 66. This yoke receives a fitting 84 removably attached thereto from which extends rod 86 to a float 88. This float 88 is desirably positioned within the sump 14 through a predetermined contour of the rod 86 and placement and form of the detachable element 84 on the yoke 80. Should liquid back into the sump, it lifts the float 88 which force is transmitted to shift the pin 66 to initiate the collapse of the toggle-joint connection, and allow the valve to close.

A screen type sleeve 90 may be placed about a predetermined portion of the valve for the obvious reasons.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed and is desired to secure by United States Letters Patent:

1. A valve for the opening into a drain comprising a ring having an orifice therethrough, said ring providing a valve seat about the orifice on the drain side thereof, a frame on the opposite side of said ring providing a bridge across the orifice, a valve stem reciprocatively mounted in said bridge, a gasket freely mounted by said stem adjacent one end thereof for cooperating with said valve seat, retaining means for said gasket fixed to the stem adjacent said gasket, an operating head at the other end of said stem, a spring coacting between said stem and bridge normally urging said gasket to engage said seat, a toggle-joint connection between said retaining means and frame operative to lock said gasket away from said seat, and means to initiate collapse of the toggle from its locking position.

2. The structure set forth in claim 1 wherein a tubular sleeve is provided about the spring to house a substantial portion thereof when said valve is closed and all of said spring when the valve is in fully open position, the upper terminus of said sleeve providing a stop for said operating head.

3. A valve for the opening into a drain comprising a ring having an opening therethrough and providing a valve seat about the opening on one side thereof, a frame mounted on the opposite side of the ring including a bridge across the opening, a valve stem reciprocatively mounted in the bridge with one end thereof extending axially through said opening, a gasket carried by said end for coacting with said seat, an operating head on the remote end of said stem, spring means between said head and bridge normally urging the gasket into seat engaging position, a first pin mounted by said bridge, a second pin mounted by said stem, a toggle-joint connection between said pins including an elbow joint, and an element rockably mounted on said first pin having a contact extension therefrom and an extension to engage said elbow joint and shift the same in response to pressure application upon the contact extension.

4. In a valve for opening and closing a passage-way for fluids therethrough comprising a ring provided with an axial opening and providing a valve seat on one side thereof, a frame mounted on the opposite side thereof including a diametrically disposed bridge having a way therein in axial alignment with the ring, said way providing a slide, a valve stem reciprocatively mounted in said slide and extending in opposite directions therefrom, a gasket mounted on one end of said stem to coact with said valve seat, an operating head on the opposite end of said stem, spring means coacting between said bridge and head to normally urge said gasket against the seat, a first pin mounted in said bridge spaced from the slide, a second pin mounted by said stem adjacent to and between said bridge and the gasket, a toggle-joint connection between said pins including an elbow, means positioning said elbow in relation to said stem when the operating head is actuated to open the valve to lock said valve in open position, and means operable to shift said elbow from its locking position to initiate a collapse of the toggle-joint permitting said spring means to close said valve.

5. The structure set forth in claim 4 wherein the toggle-joint collapsing means includes a spring against which said means is moved to function and which spring resets said means upon its release.

6. A valve of the class described comprising a ring providing a valve seat on one side thereof and a bridge frame on the opposite side, a valve stem mounted by said bridge for axial reciprocatory movement through said valve seat, said stem extending beyond said bridge away from the ring, a first spring means coacting between said bridge and stem normally urging said stem outwardly from the bridge side of said ring, a plate loosely mounted on the stem on the valve seat side of said ring, a gasket carried by said plate for engaging the valve seat, a second spring means coacting between said stem and plate providing a resilient coaction between said seat and gasket, retaining means fixed on said stem against which said gasket is normally urged by said second spring, a toggle connection between said retaining means and said bridge, and means swingably mounted on said bridge having an extension adaptable to shift said toggle from a dead center alignment thereof.

7. The structure set forth in claim 6 wherein the operating effect of the first spring means is just sufficient to move the gasket into seat contacting position free from any substantial pressure against the second spring means, and means for adjustably mounting said second spring on the stem.

8. In a valve, a ring provided with a valve seat on one side thereof, a frame mounted on said ring on the opposite side including a bridge across said ring, a valve stem slidably mounted by said bridge axially of the ring, a gasket carried by said stem for cooperating with said seat, a fulcrum on said bridge, a toggle-joint terminally connected between said fulcrum and the stem for locking said stem in position to hold said gasket clear of the seat, an arm rockably mounted on said fulcrum to initiate a collapse of the toggle-joint connection from its locking position, and spring means for shifting said stem following the collapse initiation to move the gasket into contact with said seat, means to manually shift said arm, a second arm also rockably mounted on said fulcrum to initiate a collapse of the toggle joint connection from its locking position, and a float connected to said second arm.

GEORGE W. PERRY.

References Cited in the file of this patent

UNITED STATES PATENTS

| Number | Name | Date |
|---|---|---|
| 1,159,175 | Campbell | Nov. 2, 1915 |
| 1,927,609 | Markert | Sept. 19, 1933 |
| 1,991,214 | Hoff | Feb. 12, 1935 |
| 2,057,333 | Guibert | Oct. 13, 1936 |

FOREIGN PATENTS

| Number | Country | Date |
|---|---|---|
| 191,599 | Great Britain | Jan. 18, 1923 |